United States Patent [19]

Baba

[11] Patent Number: 4,770,506
[45] Date of Patent: Sep. 13, 1988

[54] GRADIENT INDEX SINGLE LENS

[75] Inventor: Takeshi Baba, Yokohama, Japan

[73] Assignee: Canon Kabushiki Kaisha, Tokyo, Japan

[21] Appl. No.: 70,602

[22] Filed: Jul. 6, 1987

Related U.S. Application Data

[63] Continuation of Ser. No. 684,793, Dec. 21, 1984, abandoned.

[30] Foreign Application Priority Data

Dec. 28, 1983 [JP] Japan ............................. 58-245914
Jun. 19, 1984 [JP] Japan ............................. 59-125749
Jun. 19, 1984 [JP] Japan ............................. 59-125750

[51] Int. Cl.$^4$ ........................ G02B 3/14; G02B 15/00
[52] U.S. Cl. ................................................. 350/413
[58] Field of Search ........................................ 350/413

[56] References Cited

U.S. PATENT DOCUMENTS

| | | | |
|---|---|---|---|
| 3,486,808 | 12/1969 | Hamblen | 350/413 |
| 3,626,194 | 12/1971 | Hirano et al. | 350/413 |
| 4,457,590 | 7/1984 | Moore | 350/413 |

*Primary Examiner*—John K. Corbin
*Assistant Examiner*—Rebecca D. Gass
*Attorney, Agent, or Firm*—Fitzpatrick, Cella, Harper & Scinto

[57] ABSTRACT

This specification discloses a single lens having an index gradient in a direction perpendicular to the optic axis thereof, and the surface of the single lens on the light beam incidence side when the single lens is used at a reduced magnification is formed into a surface concave relative to the object side, whereby the working distance is sufficiently long and aberration are well corrected.

16 Claims, 3 Drawing Sheets

GRADIENT INDEX SINGLE LENS

This application is a continuation of application Ser. No. 684,793 filed Dec. 21, 1984, now abandoned.

BACKGROUND OF THE INVENTION

1. Field of the Invention

This invention relates to an gradient index lens suitable as the collimator lens of a semiconductor laser or the pickup objective lens of an optical disc.

2. Description of the Prior Art

SELFOC lens (trade name) is well known as a lens having an index gradient in a direction perpendicular to the optic axis thereof, i.e., a so-called radial gradient index lens, and is used as an erect one-to-one magnification imaging element in a copying apparatus or the like. A merit of such a gradient index lens is that it is a single lens whose opposite end surfaces are planar surfaces and yet it has a relatively good performance and is excellent in mass productivity.

Attempts have also been made to make the best use of such a merit and use the gradient index lens as the collimator lens of a semiconductor laser or the pickup objective lens of an optical disc.

It is desired that the lens used for such a usage have a long working distance. If an attempt is made to form a lens having a long working distance by an gradient index single lens whose opposite surfaces are planar surfaces, the length d in the direction of the optic axis must be shortened. However, if the length d is shortened, the index gradient in a direction orthogonal to the optic axis will become steep and not only manufacture will become difficult but also aberrations cannot be well corrected.

Also, in the application of a lens of this type, it is necessary in terms of performance that particularly spherical aberration and sine condition be well corrected, but where a radial gradient single lens is used, spherical aberration and sine condition cannot be corrected at a time if the opposite surfaces of the single lens are planar surfaces.

SUMMARY OF THE INVENTION

It is an object of the present invention to provide a gradient index single lens which has a sufficiently long working distance and in which aberrations are well corrected.

It is a further object of the present invention to provide a gradient index single lens in which both spherical aberration and sine condition are well corrected.

It is still a further object of the present invention to provide a gradient index single lens in which the Petzval sum is small and which has a good off-axis characteristic.

The single lens according to the present invention intends to achieve the above objects by the surface of the single lens on the light beam incidence side when the single lens is used at a reduced magnification forming a surface concave relative to the object side. In the present application, the light beam incidence side of the single lens in a case where a light beam travels from the concave surface of the single lens when used at a reduced magnification to the other surface of the single lens is defined as the object side, and the light beam emergence side of the single lens is defined as the image side. Accordingly, the value of the radius of curvature of a surface is positive when the center of curvature lies more adjacent to the image side than to the surface, and is negative when the center of curvature lies more adjacent to the object side than to the surface.

Also, in the single lens according to the present invention, where the other surface is a planar surface, in order to correct aberrations well, it is desirable to endow the single lens with the following relations:

$$-1.0 \leq \gamma_1/f \leq -0.3$$

$$0.8 \leq d/f \leq 5.0$$

where $\gamma_1$ is the radius of curvature of the concave surface, d is the thickness of the lens and f is the focal length of the lens.

Further, in the single lens according to the present invention, where the surface on the light beam emergence side has a surface concave relative to the image side, it is desirable to endow the single lens with the following relations:

$$-2.7 \leq f/\gamma_1 \leq -1.2$$

$$0 < f/\gamma_2 \leq 2.9$$

$$1.3 \leq d/f \leq 4.5$$

where $\gamma_2$ is the radius of curvature of the surface on the light beam emergence side.

Furthermore, in the single lens according to the present invention, where the surface on the light beam emergence side has a surface convex relative to the image side, it is desirable to endow the single lens with the following relations:

$$-2.5 \leq f/\gamma_1 \leq -0.1$$

$$-1.4 \leq f/\gamma_2 < 0$$

$$1.0 \leq d/f \leq 5.0.$$

DESCRIPTION OF THE PREFERRED EMBODIMENTS

In the present specification, it is to be understood that the end surface on the object side when the single lens is used at a reduced magnification is the first surface of the single lens and the end surface on the image side is the second surface of the single lens. Accordingly, where the single lens of the present invention is used as the collimator lens of a semiconductor laser, the surface thereof adjacent to the semiconductor laser is the second surface, and where the single lens is used as the pickup objective lens of an optical disc, the surface thereof adjacent to the optical disc is the second surface.

To increase the working distance, it is effective to dispose a power concave toward the object side when the single lens is used at a reduced magnification. For this reason, in the single lens of the present invention, the first surface thereof is a surface concave toward the object side.

By the concave surface thus facing the object side, the image side principal point of the lens is formed more adjacent to the image side. Thus, even in a lens of the same focal length, the working distance is longer.

In such a lens, spherical aberration and sine condition must be well corrected. To correct these aberations, it is necessary to make the values of the tertiary spherical aberration coefficient and coma coefficient small.

In a radial gradient single lens wherein the refractive index N is expressed as follows relative to the distance $\gamma$ from the optic axis:

$$N(\gamma)=N_0+N_1\gamma^2+N_2\gamma^4+N_3\gamma^6+ \ldots (N_0, N_1, N_2, N_3, \ldots \text{ constant}), \quad (1)$$

parameters which contribute to the value of the tertiary aberration coefficient are $N_0$, $N_1$, $N_2$ and
 $\gamma_1$: radius of curvature of the first surface
 $\gamma_2$: radius of curvature of the second surface
 d: thickness.
Of these, the on-axis refractive index $N_0$ can assume only a value of the order of 1.4–1.8 and therefore, if $N_0$ is regarded as $N_0 \approx 1.6$, parameters which contribute to the tertiary aberration coefficient are considered to be $\gamma_1, \gamma_2$, d, $N_1$ and $N_2$.

On the other hand, the required conditions are the following three:

| tertiary spherical aberration coefficient | $I \approx 0$ | |
|---|---|---|
| tertiary coma coefficient | $II \approx 0$ | (2) |
| focal length | $f = \text{constant}$ | | and therefore, even if $\gamma_1$ is fixed, there are many solutions of $\gamma_2$, d, $N_1$ and $N_2$ which satisfy condition (2). From among these many solutions, ones capable of correcting high-order aberrations or ones in which the working distance is appropriate can be selected in accordance with the conditions of use.

Among $\gamma_2$, d, $N_1$ and $N_2$, those which contribute to the paraxial amount are $\gamma_2$, d and $N_1$ and, as shown in P. J. Sands: Tour. Opt. Soc. Am., 60, pages 1436–1443 (1970), $N_2$ is in a linear relation with the tertiary aberration coefficients. Accordingly, d, $N_1$ and $N_2$ which satisfy condition (2) for certain $\gamma_1$ and $\gamma_2$ can be found by the following procedures:

(i) d is given arbitrarily;
(ii) $N_1$ is found so that the focal length f of the single lens is constant;
(iii) $N_2$ is found so that $I=0$; and
(iv) The procedures (i)–(iii) are repeated with d varied so that $II=0$.

After the initial values of the parameters $\gamma_1, \gamma_2$, d, $N_1$ and $N_2$ have been determined by such procedures, each parameter may be varied as in the case of the conventional lens design to thereby balance each aberration. Also, by introducing the high-order coefficients $N_3$ and $N_4$ of the index gradient, it is possible to correct spherical aberration better and achieve a great aperture. In the single lens according to the present invention obtained via such a designing process, it has been found that when the first surface is a surface concave toward the object side, preferable conditions for correcting spherical aberration and sine condition will differ more or less depending on the shape of the second surface. First, where the second surface is a planar surface, it is desirable for the correction of spherical aberration and sine condition that $\gamma_1$ and d satisfy the following conditions:

$$-1.0 \leq \gamma_1/f \leq -0.3 \quad (3\text{-}1)$$

$$0.8 \leq d/f \leq 5.0 \quad (3\text{-}2),$$

where $\gamma_1$ is the radius of curvature of the first surface, d is the on-axis thickness of the lens, and f is the focal length of the lens. If $\gamma_1$ exceeds the upper limit of condition (3-1), correction of spherical aberration will become difficult, and if $\gamma_1$ exceeds the lower limit of condition (3-1), the effect of correction of coma by the first surface will not be obtained.

Also, if d exceeds the lower limit of condition (3-2), the absolute value of $N_1$ will increase in order to keep the focal length constant and thus, manufacture will become difficult and spherical aberration will be aggravated. If d exceeds the upper limit of condition (3-2), the working distance will decrease.

For better correction of spherical aberration and condition, it is desirable that the following condition be further satisfied:

$$0.15 \leq |\gamma_1/d| \leq 0.40 \quad (3\text{-}3)$$

That is, when $|\gamma_1|$ decrease and the negative refractive power by the first surface becomes strong, d is decreased with the relation of condition (3-3) and the index gradient is intensified and the focal length is kept constant, whereby the positive spherical aberration created by the first surface can be negated by the negative spherical aberration created by the index gradient.

Figure 1:
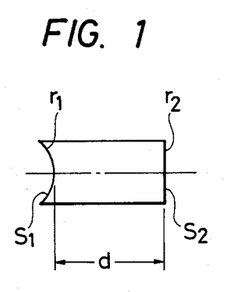
FIG. 1 shows the shape of an embodiment of the gradient index single lens according to the present invention.

Embodiments of the present invention in a case where the second surface is a planar surface will hereinafter be described. Table 1 below shows the lens data of first to sixth embodiments of the single lens according to the present invention, and as shown in FIG. 1, $\gamma_1$ is the radius of curvature of the first surface $S_1$, and d is the thickness of the lens. The radius of curvature $\gamma_2$ of the second surface $S_2$ is infinite, that is, the second surface $S_2$ is a planar surface. $N_0, N_1, N_2$ and $N_3$, as shown in equation (1), are constants which determine the index gradient of the single lens. Also, the lens data shown are the values when the focal length is standardized to 1.

TABLE 1

| No. | $\gamma_1$ | d | $N_0$ | $N_1$ | $N_2$ | $N_3$ |
| --- | --- | --- | --- | --- | --- | --- |
| 1 | −0.3846 | 1.026 | 1.6 | −1.005 | 0.5350 | 0 |
| 2 | −0.5152 | 1.801 | 1.6 | −0.4753 | 0.1222 | −0.0606 |
| 3 | −0.7156 | 3.670 | 1.6 | −0.2009 | 0.0249 | 0 |
| 4 | −0.8333 | 4.577 | 1.6 | −0.1700 | 0.0197 | 0 |
| 5 | −0.4879 | 1.773 | 1.45 | −0.4534 | 0.1366 | −0.0981 |
| 6 | −0.5308 | 1.735 | 1.75 | −0.5245 | 0.1275 | −0.0499 |

Table 2 below shows the values of the back focal length Sk′, tertiary spherical aberration coefficient I, coma coefficient II, astigmatism coefficient III, Petzval sum P, distortion coefficient V and $|\gamma_1/d|$ of the respective embodiments (No. 1–No. 6) shown in Table 1 when the object is at infinity.

TABLE 2

| No. | Sk′ | I | II | III | P | V | $|\gamma_1/d|$ |
| --- | --- | --- | --- | --- | --- | --- | --- |
| 1 | 1.20 | −0.021 | 0.087 | −0.491 | −0.170 | 1.82 | 0.37 |
| 2 | 1.11 | −0.025 | −0.168 | −0.387 | −0.059 | 2.22 | 0.29 |
| 3 | 0.75 | 0.106 | −0.104 | −0.696 | 0.052 | 3.35 | 0.19 |
| 4 | 0.33 | −0.005 | 0.024 | −0.736 | 0.157 | 2.08 | 0.18 |
| 5 | 0.98 | −0.049 | −0.221 | −0.464 | 0.132 | 2.21 | 0.28 |
| 6 | 1.24 | −0.014 | −0.147 | −0.270 | −0.213 | 2.08 | 0.31 |

Figure 2A:
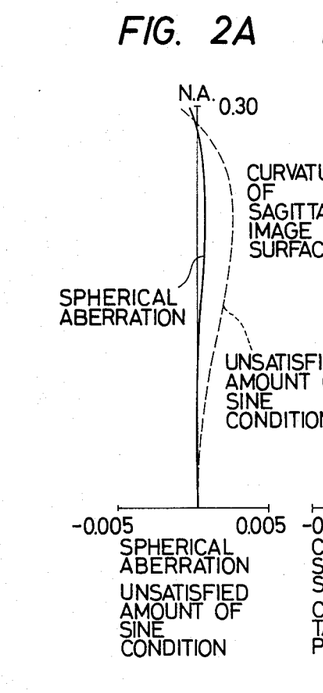
FIGS. 2A and 2B show the aberrations in the embodiment of the single lens shown in FIG. 1.
Figure 2B:
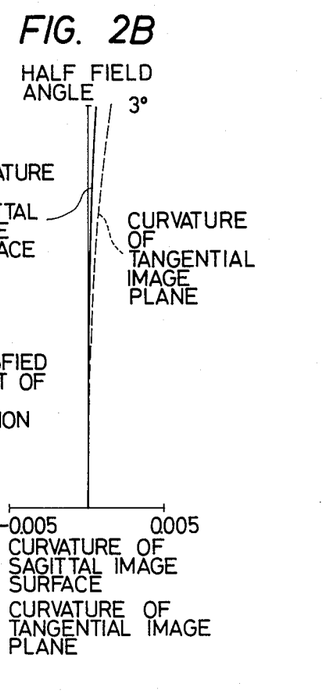
Figure 3:
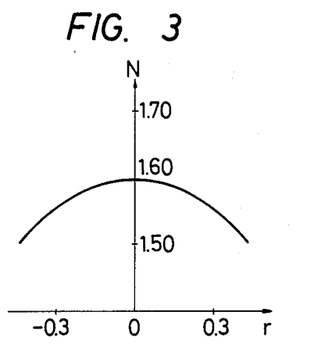
FIG. 3 is a graph showing the index gradient in the embodiment of the single lens shown in FIG. 1.

FIGS. 2A and 2B show the aberrations of the second embodiment (No. 2). In FIG. 2A, solid line indicates spherical aberration and broken line indicates the unsatisfied amount of sine condition, and in FIG. 2B, solid line indicates the curvature of sagittal image plane and broken line indicates the curvature of tangential image plane. FIG. 3 shows the index gradient $N(\gamma)$ of the lens shown in the second embodiment in the direction orthogonal to the optic axis thereof.

As shown in FIGS. 2A and 2B, the various aberrations are well corrected, and the aberrations of the other lenses are such that NA is 0.2–0.3 and the half field angle is of the order of 3°, which means a good performance.

The tertiary aberration coefficients in Table 2 and the aberration graphs of FIG. 2 are the values when the object is at infinity and the entrance pupil is coincident with the forward principal point position.

In these embodiments as shown in Table 2, the tertiary spherical aberration coefficient I and coma coefficient II are well corrected and in making the aperture of the lens great, high-order spherical aberrations may be corrected by the control of the coefficient of high-order index gradient.

Description will now be made of an embodiment in which the second surface of the single lens according to the present invention has a surface concave toward the image side. In this embodiment, the various aberrations are well corrected by making the second surface also concave toward the image side. Heretofore, in a homogeneous lens system, particularly, a system comrpising a homogeneous single lens alone, it has been considered to be undesirable to make the first surface concave toward the object side, because the lens becomes more bulky than necessary by the first surface being a concave surface, and if the first surface which contributes most greatly to spherical aberration is made concave, correction of negative spherical aberration created by the first surface is difficult and particularly, correction of high-order spherical aberrations is difficult, and this has also been considered to be undesirable. However, in the present invention, by using a medium having an index gradient, the lens diameter does not become great even if a long working distance is secured with the first surface as a concave surface. Further, by endowing the second surface with a curvature concave toward the image side, good correction of the various aberrations is accomplished. Also, in the single lens of this type, it is desirable that the following conditions be satisfied among the radius of curvature $\gamma_1$ of the first surface, the radius of curvature $\gamma_2$ of the second surface, the on-axis lens thickness d and the focal length f:

$$-2.7 \leq f/\gamma_1 \leq -1.2 \quad (4\text{-}1)$$

$$0 < f/\gamma_2 \leq 2.9 \quad (4\text{-}2)$$

$$1.3 \leq d/f \leq 4.5 \quad (4\text{-}3)$$

If $f/\gamma_1$ exceeds the lower limit of condition (4-1), the concavity of the first surface will become sharper and correction of spherical aberration will become difficult. Also, if $f/\gamma_1$ exceeds the upper limit of condition (4-1), the increase in the working distance and the effect of aberration correction by making the first surface concave will not be obtained.

I $f/\gamma_2$ exceeds the upper limit of condition (4-2), the curvature of the second surface will become sharper and again, spherical aberration will be aggravated. The lower limit of condition (4-2) is a value determined naturally by the shape of the second surface.

If d/f exceeds the lower limit of condition (4-3), it will be necessary to make the index gradient sharper in order to keep the focal length at f, and manufacture will become difficult and spherical aberration will be aggrevated. If d/f exceeds the upper limit of condition (4-3), it will be undesirable in making the lens compact.

To correct spherical aberration and sine condition well at one time, it is desirable that the following condition be further satisfied:

$$-1.9 \leq f/\gamma_1 + f/\gamma_2 \leq 0.3 \quad (4\text{-}4)$$

Condition (4-4) is a formula related to the difference in power between the first surface and the second surface, and if any of the upper limit and the lower limit of condition (4-4) is exceeded, simultaneous correction of spherical aberration and sine condition will become difficult. That is, if the range of condition (4-4) is exceeded, coma which is an asymmetric aberration will be increased due to the unbalance of power between the first surface and the second surface.

To accomplish better correction of spherical aberration and sine condition, it is desirable that the following condition be satisfied:

$$-8.1 \leq (1/\gamma_1 - 1/\gamma_2) d \leq -3.4 \quad (4\text{-}5)$$

If the lower limit of condition (4-5) is exceeded, it will become difficult to negate the spherical aberration created by the two concave surfaces by the spherical aberration created by the index gradient, and if the upper limit of condition (4-5) is exceeded, the effect of coma correction will become null.

Embodiment of the present invention will now be shown. Table 3 below shows the lens data of the eleventh to seventeenth embodiments of the present invention, and in any of these lens data, the focal length is standardized to 1. Table 4 below shows the values of the back focal length S′k, tertiary spherical aberration coefficient I, coma coefficient II, astigmatism coefficient III, Petzval sum P, distortion coefficient V, $(1/\gamma_1 + 1/\gamma_2)$ and $(1/\gamma_1 - 1/\gamma_2)d$ of the embodiments shown in Table 3 when the object is at infinity.

TABLE 3

| Embodiment No. | $\gamma 1$ | $\gamma 2$ | d | $N_0$ | $N_1$ | $N_2$ | $N_3$ |
|---|---|---|---|---|---|---|---|
| 11 | −0.4110 | 0.3806 | 1.452 | 1.45 | −0.9355 | 0.7828 | −0.7969 |
| 12 | −0.5207 | 0.4580 | 1.774 | 1.6 | −0.7615 | 0.4229 | −0.2772 |
| 13 | −0.5336 | 0.7260 | 1.783 | 1.6 | −0.6812 | 0.3324 | −0.2075 |
| 14 | −0.5273 | 5.0000 | 1.827 | 1.6 | −0.5036 | 0.1501 | −0.0741 |
| 15 | −0.5542 | 2.1350 | 2.056 | 1.6 | −0.4739 | 0.1414 | −0.0679 |
| 16 | −0.5611 | 1.3700 | 2.068 | 1.6 | −0.4999 | 0.1641 | −0.0802 |
| 17 | −0.7336 | 3.2570 | 3.942 | 1.6 | −0.2069 | 0.0270 | −0.0058 |

TABLE 4

| Embodiment No. | S'k | I | II | III | P | V | $(1/\gamma_1 + 1/\gamma_2)$ | $(1/\gamma_1 - 1/\gamma_2)$ |
|---|---|---|---|---|---|---|---|---|
| 11 | 0.564 | −0.188 | −0.040 | 0.181 | −0.261 | 0.683 | 0.19 | −7.35 |
| 12 | 0.583 | 0.016 | −0.139 | 0.358 | −0.495 | 0.567 | 0.26 | −7.28 |
| 13 | 0.693 | −0.034 | −0.122 | 0.197 | −0.274 | 1.043 | −0.50 | −5.80 |
| 14 | 1.010 | −0.025 | −0.154 | −0.275 | −0.067 | 1.941 | −1.70 | −3.83 |
| 15 | 0.867 | −0.036 | −0.107 | −0.219 | −0.091 | 1.852 | −1.34 | −4.67 |
| 16 | 0.790 | −0.033 | −0.100 | −0.085 | −0.136 | 1.636 | −1.05 | −5.20 |
| 17 | 0.496 | −0.003 | −0.035 | −0.637 | 0.011 | 3.107 | −1.06 | −6.58 |

Figure 4:
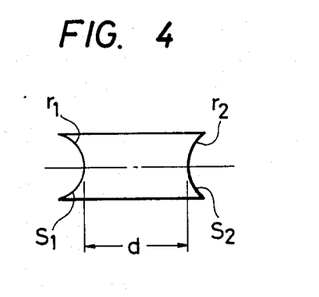
FIG. 4 shows the shape of another embodiment of the index gradient type single lens according to the present invention.
Figure 5:
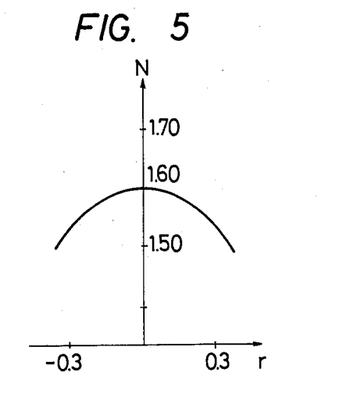
FIG. 5 is a graph showing the index gradient in the embodiment of the single lens shown in FIG. 4.
Figures 6A, 6B:
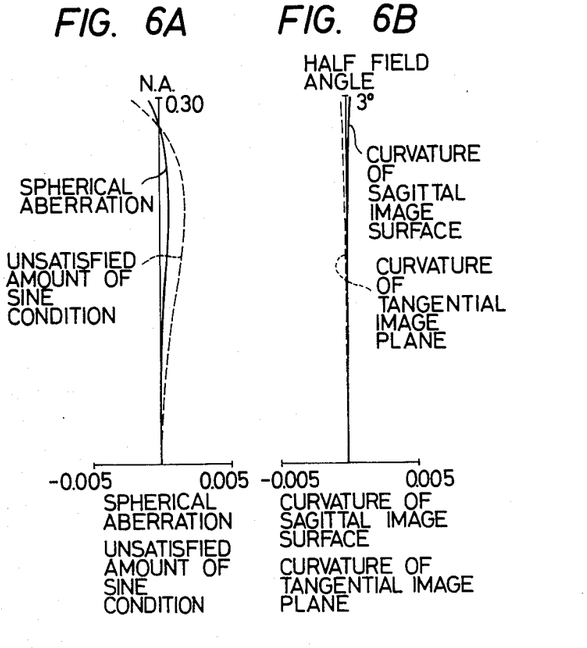
FIGS. 6A and 6B show the aberrations in the embodiment of the single lens shown in FIG. 4.

FIG. 4 is a cross-sectional view of the lens of the thirteenth embodiment, and FIG. 5 is a graph showing the state of the index gradient of the thirteenth embodiment. In FIG. 5, the ordinate represents the refractive index N and the abscissa represents the distance $\gamma$ from the optic axis. FIGS. 6A and 6B show the various aberrations of the thirteenth embodiment.

Not only in the single lens of the thirteenth embodiment but also in the other lenses, N.A. is 0.3 and the half field angle is of the order of 3°, and these lenses have a good performance. Particularly, the eleventh and thirteenth to seventeenth embodiments have a small Petzval sum and have a good field angle characteristic as the lenses of this type.

Also, as can be seen from Table 4, the tertiary spherical aberration coefficient I and coma coefficient II are well corrected, and further, where a great aperture is to be achieved, high-order spherical aberrations may be corrected by the control of the high-order index gradient coefficients.

The tertiary aberation coefficients in Table 4 and the aberration graphs of FIGS. 6A and 6B have all been calculated with the object being at infinity and with the entrance pupil lying at the forward principal point position.

Description will now be made of a single lens in which the second surface is convex toward the image side. In this embodiment, the various aberrations are well corrected by the second surface also being made convex toward the image side. As previously described, in a homogeneous lens system, particularly, a system comprising a homogeneous single lens alone, it has heretofore been considered to be undesirable to make the first surface concave toward the object side because it causes the lens to be more bulky than necessary, and if the first surface which contributes most greatly to spherical aberration is made concave, it is difficult to correct the negative spherical aberration created by the first surface, particularly, high-order spherical aberrations, and this has also been considered to be undesirable. However, in the present invention, by using a medium having an index gradient, the lens diameter does not become great even if the first surface is made concave and a long working distance is assumed. Further, good correction of the various aberrations is accomplished by endowing the second surface with a curvature convex toward the image side. In the lens of this type, it is desirable that the following conditions be satisfied among the radius of curvature $\gamma_1$ of the first surface, the radius of curvature $\gamma_2$ of the second surface, the on-axis lens thickness d and the focal length f:

$$-2.5 \leqq f/\gamma_1 \leqq -0.1 \qquad (5\text{-}1)$$

$$-1.4 \leqq f/\gamma_2 < 0 \qquad (5\text{-}2)$$

$$1.0 \leqq d/f \leqq 5.0 \qquad (5\text{-}3)$$

If $f/\gamma_1$ exceeds the lower limit of condition (5-1), the concavity of the first surface will become sharper and correction of spherical aberration will become difficult. If $f/\gamma_1$ exceeds the upper limit of condition (5-1), the increase in the working distance by making the first surface concave and the effect of aberration correction will not be obtained.

If $f/\gamma_2$ exceeds the lower limit of condition (5-2), the curvature of the second surface will become sharper and spherical aberration will also be aggravated. The upper limit of condition (5-2) is a value determined naturally by the shape of the second surface.

If $d/f$ exceeds the lower limit of condition (5-3), it will be necessary to make the index gradient sharper in order to keep the focal length at f, and manufacture will become difficult and spherical aberration will be aggravated. If $d/f$ exceeds the upper limit of condition (5-3), it will be undesirable in making the lens compact.

To correct spherical aberration and sine condition well at one time, it is desirable that the following condition be further satisfied:

$$-2.8 \leqq f/\gamma_1 + f/\gamma_2 \leqq -1.2 \qquad (5\text{-}4)$$

Condition (5-4) is a formula related to the difference in power between the first surface and the second surface, and if any of the upper limit and the lower limit of condition (5-4) is exceeded, simultaneous correction of spherical aberration and sine condition will become difficult. That is, if the range of condition (5-4) is exceeded, coma which is an asymmetric aberration will be increased due to the unbalance of power between the first surface and the second surface.

To accomplish better correction of spherical aberration and sine condition, it is desirable that the following condition be satisfied:

$$-7.2 \leq (1/\gamma_1 + 1/\gamma_2)d \leq -2.2 \tag{5-5}$$

If the value of $(1/\gamma_1 + 1/\gamma_2)d$ exceeds the lower limit of condition (5-5), correction of spherical aberration will become difficult and astigmatism will tend to increase, and this is not preferable. If the value of $(1/\gamma_1 + 1/\gamma_2)d$ exceeds the upper limit of condition (5-5), spherical aberration will be aggravated when d is small, and the effect of correcting coma will not be obtained when the curvatures of the two surfaces are weak.

Embodiments of the present invention will now be shown. Table 5 below shows the lens data of the twenty-first to twenty-eighth embodiments. In any of these lens data, the focal length is standarized to 1. Table 6 below shows the values of the back focal length S'k, tertiary spherical aberration coefficient I, coma coefficient II, astigmatism coefficient III, Petzval sum P, distortion coefficient V, $(1/\gamma_1 + 1/\gamma_2)$ and $(1/\gamma_1 + 1/\gamma_2)d$ of the respective embodiments shown in Table 5 when the object is at infinity.

TABLE 5

| Embodiment No. | $\gamma_1$ | $\gamma_2$ | d | $N_0$ | $N_1$ | $N_2$ | $N_3$ |
|---|---|---|---|---|---|---|---|
| 21 | −0.4350 | −4.1750 | 1.194 | 1.6 | −0.7365 | 0.2534 | −0.1899 |
| 22 | −0.6100 | −4.4410 | 2.857 | 1.6 | −0.2343 | 0.0314 | −0.0098 |
| 23 | −0.7336 | −2.054 | 3.579 | 1.6 | −0.1446 | 0.0220 | −0.0026 |
| 24 | −0.8500 | −4.7496 | 4.618 | 1.75 | −0.1306 | 0.0128 | −0.0014 |
| 25 | −1.4049 | −1.4049 | 3.450 | 1.6 | −0.1792 | 0.0440 | 0.0022 |
| 26 | −1.6550 | −0.9594 | 2.396 | 1.75 | −0.0696 | 0.1569 | 0.2536 |
| 27 | −2.1450 | −0.7894 | 1.848 | 1.6 | −0.1319 | 0.2275 | 0.4272 |
| 28 | −5.0000 | −0.7841 | 1.696 | 1.6 | −0.1324 | 0.2478 | 0.4579 |

TABLE 6

| Embodiment No. | S'k | I | II | III | P | V | $(1/\gamma_1 + 1/\gamma_2)$ | $(1/\gamma_1 + 1/\gamma_2)d$ |
|---|---|---|---|---|---|---|---|---|
| 21 | 1.223 | −0.049 | −0.334 | −0.248 | −0.085 | 1.781 | −2.54 | −3.03 |
| 22 | 1.162 | −0.004 | −0.065 | −0.863 | −0.007 | 3.571 | −1.86 | −5.33 |
| 23 | 1.244 | 0.007 | −0.008 | −1.051 | 0.076 | 4.217 | −1.85 | −6.62 |
| 24 | 1.047 | 0.007 | −0.038 | −0.749 | −0.020 | 3.971 | −1.59 | −6.41 |
| 25 | 1.335 | 0.344 | −0.089 | −0.619 | 0.293 | 1.816 | −1.42 | −4.91 |
| 26 | 0.502 | 0.013 | −0.034 | −0.236 | 0.485 | 1.343 | −1.65 | −3.95 |
| 27 | 1.016 | 0.142 | −0.116 | −0.368 | 0.481 | 1.178 | −1.72 | −3.18 |
| 28 | 0.887 | 0.079 | −0.083 | 0.249 | 0.578 | 0.780 | −1.48 | −2.50 |

Figure 7:
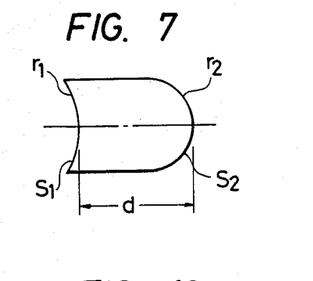
FIG. 7 shows the shape of still another embodiment of the index gradient type single lens according to the present invention.
Figure 8:
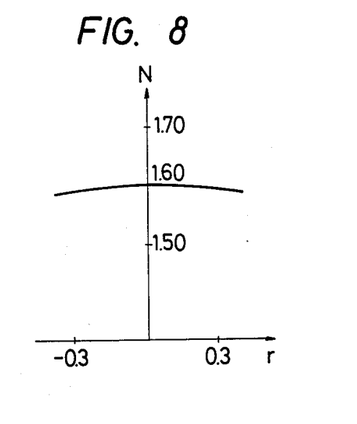
FIG. 8 is a graph showing the index gradient in the embodiment of the single lens shown in FIG. 7.
Figures 9A, 9B:
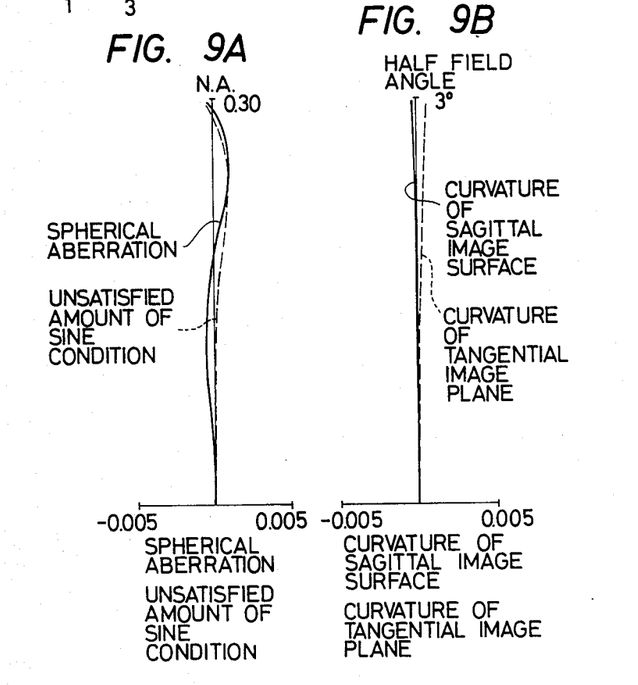
FIGS. 9A and 9B show the aberrations in the embodiment of the single lens shown in FIG. 7.

FIG. 7 is a cross-sectional view of the lens of the twenty-seventh embodiment, and FIG. 8 is a graph showing the state of the index gradient of the twenty-seventh embodiment. In FIG. 8, the ordinate represents the refractive index N and the abscissa represents the distance $\gamma$ from the optic axis. FIGS. 9A and 9B show the various aberrations of the twenty-seventh embodiment.

Not only in the single lens shown in the twenty-seventh embodiment, but also in the other lenses, N.A. is 0.3 and the half field angle is of the order of 3°, and these lenses have a good performance. Particularly, the twenty-first to twenty-fifth embodiments each have a small Petzval sum and have a good field angle characteristic as the lenses of this type.

Also, as can be seen from Table 6, the tertiary spherical aberration coefficient I and coma coefficient II are well corrected, and further, when a great aperture is to be achieved, high-order spherical aberrations may be corrected by the control of high-order index gradient coefficients.

The tertiary aberration coefficients in Table 6 and the aberration graphs of FIGS. 9A and 9B have all been calculated with the object being at infinity and with the entrance pupil lying at the forward principal point position.

Also, in the above-described embodiments, correction of spherical aberration is effected by the coefficients $N_2$, $N_3$, ... of the index gradient, but a similar effect can also be obtained by introducing a non-spherical surface into the first surface.

This is because for the tertiary spherical aberration coefficient created by the index gradient, $N_2$ contributes in the form of $N_2 \times \int h^3(x)dx$ and for the tertiary coma coefficient, $N_2$ contributes in the form of $N_2 \times \int h^2(x)\bar{h}(x)dx$, where $h(x)$ is the height of the paraxial on-axis ray at a point in a heterogeneous medium and $\bar{h}(x)$ is the height of the paraxial principal ray, and integration is effected in the direction of the optic axis of the heterogeneous medium. Accordingly, these integrated values are determined by only $\gamma_1$, $\gamma_2$, d, $N_0$, $N_1$, the object and the position of the entrance pupil, but if the entrance pupil is situated near the lens and the lens is not very long, $\bar{h}(x)$ will be a value considerably smaller than $h(x)$ and $N_2$ will hardly affect the coma coefficient. That is, the value of the coma coefficient is determined by only $\gamma_1$, $\gamma_2$, d, $N_0$, $N_1$ and the object distance.

It is easy to obtain the correction effect of spherical aberration by $N_2$ by the fourth-order non-spherical coefficient of the first surface, but again in that case, the fourth order non-spherical coefficient does not contribute to the coma coefficient. In the stage in which spherical aberration has been corrected, the coma coefficient has nothing to do with the position of the entrance pupil and therefore, if the entrance pupil lies on the first surface, the contribution of the fourth-order non-spherical coefficient to the coma coefficient will become zero.

Such a circumstance also basically holds true with respect to high-order aberrations and therefore, the coefficients $N_2$, $N_3$, ... if the index gradient are nearly equivalent in aberration correction to the fourth-order, the sixth-order, ... non-spherical coefficients.

Also, as shown in the above-described embodiments, the Petzval sum P is a value approximate to zero and thus, the above-described embodiments have a good field angle characteristic as single lenses of this type.

Also, in the present invention, it is desirable that the high-order coefficients of the index gradient be small and have an index gradient approximate to the so-called square gradient.

Such an index gradient has heretofore also been achieved by the ion exchange method or the like, and can also be formed by the light copolymerizing method or the like as shown in Y. Koike and Y. Ohtsuka: *Applied Optics*, 22, Pages 418–423 (1983).

Figure 10:
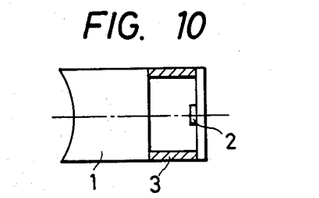
FIG. 10 shows an embodiment in which the index gradient type single lens according to the present invention is used as a collimator lens.

In the above-described embodiments, where one end surface is planar, not only the working and inspection of the lens becomes remarkably easy, but also the structure of the lens barrel is remarkably simplified. For example, FIG. 10 shows an embodiment in which the single lens is used as the collimator lens of a semiconductor laser. In FIG. 10, reference numeral 1 designates the single lens according to the present invention, reference numeral 2 denotes a semiconductor laser, and reference numeral 3 designates a barrel for supporting the single lens 1 and the semiconductor laser 2 integrally with each other. Where the end surface of the lens is planar, the end surface of the lens may simply be adhesively secured to the barrel, as shown. Also, where the lens is used with a prism or the like being disposed rearwardly of the lens, the end surface of the lens can be adhesively secured to the surface of the prism or the like and thus, not only the support structure becomes simple, but also effectiveness is obtained in reducing the surface reflection.

Also, the present invention intends to have a good performance as a single lens, but it is needless to say that such a single lens in which spherical aberration is corrected can be effectively used at a location in a combination lens system whereat spherical aberration is most liable to occur, such as the forward lens element of a photographic lens.

Also, in the foregoing, the case where the object point lies at infinity relative to the concave surface has been exemplarily shown as an embodiment in which the single lens is used at a reduced magnification, but even if the object point is at a finite distance from the concave surface, the performance of the single lens will be good if it is used at a reduced magnification.

What I claimed is:

1. A gradient index single lens having an index gradient in a direction perpendicular to an optical axis thereof and having a concave surface and a flat surface, said concave surface being adapted to face a light beam incidence side comprising an object side, and said flat surface being adapted to face a light beam emergence side comprising an image side, when said single lens is used at a reduced magnification, and satisfying the following relation:

$$-1.0 \leq \gamma_1/f \leq -0.3$$

where $\gamma_1$ is a radius of curvature of said concave surface and f is a focal length of said single lens.

2. A gradient index single lens having an index gradient in a direction perpendicular to an optical axis thereof and having a concave surface and a flat surface, said concave surface being adapted to face a light beam incidence side comprising an object side, and said flat surface being adapted to face a light beam emergence side comprising an image side when said single lens is used at a reduced magnification, and satisfying the following relation:

$$0.8 \leq d/f \leq 5.0$$

where d is an on-axis thickness of said single lens and f is a focal length of said single lens.

3. A gradient index single lens according to claim 2, further satisfying the following relation:

$$-1.0 \leq \gamma_1/f \leq -0.3$$

where $\gamma_1$ is a radius of curvature of said concave surface.

4. A gradient index single lens according to claim 3, further satisfying the following relation:

$$0.15 \leq |\gamma_1/d| \leq 0.40.$$

5. A gradient index single lens according to claim 3, wherein said flat surface is adapted to receive a light beam from a semiconductor laser so as to convert the light beam into a parallel light beam by said single lens.

6. A gradient index single lens having an index gradient in a direction perpendicular to an optical axis thereof and having a first concave surface and a second concave surface, said first concave surface being adapted to face a light beam incidence side comprising an object side, and said second concave surface being adapted to face a light beam emergence side comprising an image side when said single lens is used at a reduced magnification, and satisfying the following relation:

$$-2.7 \leq f/\gamma_1 \leq -1.2$$

where $\gamma_1$ is a radius of curvature of said first concave surface on the light incidence side and f is a focal length of said single lens.

7. A gradient index single lens according to claim 6, further satisfying the following relation:

$$0 \leq f/\gamma_2 \leq 2.9$$

where $\gamma_2$ is a radius of curvature of said second concave surface on the light emergence side.

8. A gradient index single lens according to claim 7, further satisfying the following relation:

$$1.3 \leq d/f \leq 4.5$$

where d is an on-axis thickness of said single lens.

9. A gradient index single lens according to claim 8, further satisfying the following relation:

$$-1.9 \leq f/\gamma_1 + f/\gamma_2 \leq 0.3.$$

10. A gradient index single lens according to claim 9, further satisfying the following relation:

$$-8.1 \leq d/\gamma_1 - d/\gamma_2 \leq -3.4.$$

11. A gradient index single lens according to claim 8, wherein said second concave surface on the light beam emergence side is adapted to receive a light beam from a semiconductor laser so as to convert the light beam into a parallel light beam by said single lens.

12. A gradient index single lens having an index gradient in a direction perpendicular to an optical axis thereof and having a concave surface and a convex surface, said concave surface being adapted to face a light beam incidence side comprising an object side, and said convex surface being adapted to face a light beam emergence side comprising an image side when said single lens is used at a reduced magnification, and satisfying the following relation:

$$-2.5 \leq f/\gamma_1 \leq -0.1$$

$$-1.4 \leq f/\gamma_2 < 0$$

where $\gamma_1$ and $\gamma_2$ are radii of curvature of said concave surface and said convex surface, respectively, and f is a focal length of said single lens.

13. A gradient index single lens having an index gradient in a direction perpendicular to an optical axis thereof and having a concave surface and a convex surface, said concave surface being adapted to face a light beam incidence side comprising an object side, and said convex surface being adapted to face a light beam emergence side comprising an image side when said single lens is used at a reduced magnification, and satisfying the following relations:

$$1.0 \leq d/f \leq 5.0$$

where d is an on-axis thickness of said single lens and f is a focal length of said single lens; and $$-2.5 \leq f/\gamma_1 \leq -0.1$$

$$-1.4 \leq f/\gamma_2 < 0$$

where $\gamma_1$ and $\gamma_2$ are radii of curvature of said concave surface and said convex surface, respectively.

14. A gradient index single lens according to claim 13, further satisfying $$-2.8 \leq f/\gamma_1 + f/\gamma_2 \leq -1.2.$$

15. A gradient index single lens according to claim 14, further satisfying $$-7.2 \leq d/\gamma_1 + d/\gamma_2 \leq -2.2.$$

16. A gradient index single lens according to claim 13, wherein said convex surface is adapted to receive a light beam from a semiconductor laser so as to convert the light beam into a parallel light beam by said single lens.

* * * * *